(12) United States Patent
Liao et al.

(10) Patent No.: US 9,589,315 B2
(45) Date of Patent: Mar. 7, 2017

(54) VERTEX DATA COMPRESSION METHOD AND APPARATUS FOR COMPRESSING VERTEX DATA THROUGH ANALYZING CHANNEL PROPERTIES AND RELATED VERTEX DATA DECOMPRESSION METHOD AND APPARATUS

(71) Applicant: MEDIATEK INC., Hsin-Chu (TW)

(72) Inventors: Qun-Feng Liao, San Jose, CA (US); Hailin Zhang, Santa Clara, CA (US)

(73) Assignee: MEDIATEK INC., Hsin-Chu (TW)

( * ) Notice: Subject to any disclaimer, the term of this patent is extended or adjusted under 35 U.S.C. 154(b) by 21 days.

(21) Appl. No.: 14/705,949

(22) Filed: May 6, 2015

(65) Prior Publication Data
US 2016/0328822 A1    Nov. 10, 2016

(51) Int. Cl.
*G06T 9/00* (2006.01)
*G06T 1/60* (2006.01)

(52) U.S. Cl.
CPC .................................... *G06T 1/60* (2013.01)

(58) Field of Classification Search
CPC .............. G06T 9/001; G06F 2212/401; G09G 2340/02
See application file for complete search history.

(56) References Cited

U.S. PATENT DOCUMENTS

2014/0354666 A1\* 12/2014 Yang ...................... H04N 19/50
345/555

FOREIGN PATENT DOCUMENTS

WO    2012032311    3/2012

\* cited by examiner

*Primary Examiner* — Hau Nguyen
(74) *Attorney, Agent, or Firm* — Winston Hsu; Scott Margo

(57) ABSTRACT

A vertex data compression method includes: collecting a plurality of vertices as a vertex block; extracting at least one data unit array from the vertex block, wherein each data unit array is composed of data units selected from vertex components of the vertices respectively, the data units correspond to a same channel, and each data unit is smaller than one byte; and for each data unit array, checking the data units of the data unit array to select a compression algorithm, and compressing the data units of the data unit array according to the selected compression algorithm.

20 Claims, 7 Drawing Sheets

VERTEX DATA COMPRESSION METHOD AND APPARATUS FOR COMPRESSING VERTEX DATA THROUGH ANALYZING CHANNEL PROPERTIES AND RELATED VERTEX DATA DECOMPRESSION METHOD AND APPARATUS

BACKGROUND

The present invention relates to graphics processing, and more particularly, to vertex data compression method and apparatus for compressing vertex data through analyzing channel properties and related vertex data decompression method and apparatus.

As known in the art, graphics processing is typically carried out in a pipelined fashion, with multiple pipeline stages operating on the data to generate the final rendering output (e.g., a frame that is displayed). Many graphics processing pipelines now include one or more programmable processing stages, commonly referred to as "shaders", which execute programs to perform graphics processing operations to generate the desired graphics data. For example, the graphics processing pipeline may include a vertex shader and a pixel (fragment) shader. These shaders are programmable processing stages that may execute shader programs on input data values to generate a desired set of output data values for being further processed by the rest of the graphics pipeline stages. The shaders of the graphics processing pipeline may share programmable processing circuitry, or may be distinct programmable processing units.

For example, the vertex shading operation may include a vertex position shading operation and a vertex attribute shading operation for vertices of primitives in each frame. With regard to a deferred rendering scheme (e.g., a bin-based rendering scheme), a conventional design is to perform the vertex position shading operation and the vertex attribute shading at the binning process (i.e., vertex phase (VP) pass) and store the vertex position shading results and the vertex attribute shading results of vertices of all primitives in the frame into a bin memory, and then performs the pixel/fragment shading operation at the rendering process (i.e., pixel phase (PP) pass) after the binning process is done. Since the bin memory is needed to store vertex position shading results and vertex attribute shading results of many vertices, the memory traffic and the memory space requirement is large. In addition, the data traffic written by VP and read by PP may cause the performance drop of the deferred rendering scheme.

Thus, there is a need for an innovative vertex data compression design which is capable of saving the memory traffic and the memory space requirement.

SUMMARY

One of the objectives of the claimed invention is to provide vertex data compression method and apparatus for compressing vertex data through analyzing channel properties and related vertex data decompression method and apparatus.

According to a first aspect of the present invention, an exemplary vertex data compression method is disclosed. The exemplary vertex data compression method includes: collecting a plurality of vertices as a vertex block; extracting at least one data unit array from the vertex block, wherein each data unit array is composed of data units selected from vertex components of the vertices respectively, the data units correspond to a same channel, and each of the data units is smaller than one byte; and for each data unit array, checking the data units of the data unit array to select a compression algorithm, and compressing the data units of the data unit array according to the selected compression algorithm.

According to a second aspect of the present invention, an exemplary vertex data decompression method is disclosed. The exemplary vertex data decompression method includes: receiving data read from a compressed vertex block, wherein the compressed vertex block includes a header part and a body part, the compressed vertex block is generated from applying compression to at least one data unit array extracted from the vertex block, each data unit array is composed of data units selected from vertex components of vertices in the vertex block respectively, the data units correspond to a same channel, and each of the data units is smaller than one byte; decoding the header part for obtaining a recorded value; and generating at least a portion of a decompressed vertex component of one vertex based at least partly on the recorded value obtained from the header part.

According to a third aspect of the present invention, an exemplary vertex data compression apparatus is disclosed. The exemplary vertex data compression apparatus includes a receiving circuit and a compressor. The receiving circuit is arranged to collect a plurality of vertices as a vertex block. The compressor is arranged to extract at least one data unit array from the vertex block, wherein each data unit array is composed of data units selected from vertex components of the vertices respectively, the data units correspond to a same channel, and each of the data units is smaller than one byte; and for each data unit array, check the data units of the data unit array to select a compression algorithm, and compress the data units of the data unit array according to the selected compression algorithm.

According to a fourth aspect of the present invention, an exemplary vertex data decompression apparatus is disclosed. The exemplary vertex data decompression apparatus includes a receiving circuit and a decompressor. The receiving circuit is arranged to receive data read from a compressed vertex block, wherein the compressed vertex block includes a header part and a body part, the compressed vertex block is generated from applying compression to at least one data unit array extracted from the vertex block, each data unit array is composed of data units selected from vertex components of vertices in the vertex block respectively, the data units correspond to a same channel, and each of the data units is smaller than one byte. The decompressor is arranged to decode the header part for obtaining a recorded value, and generate at least a portion of a decompressed vertex component of one vertex based at least partly on the recorded value obtained from the header part.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
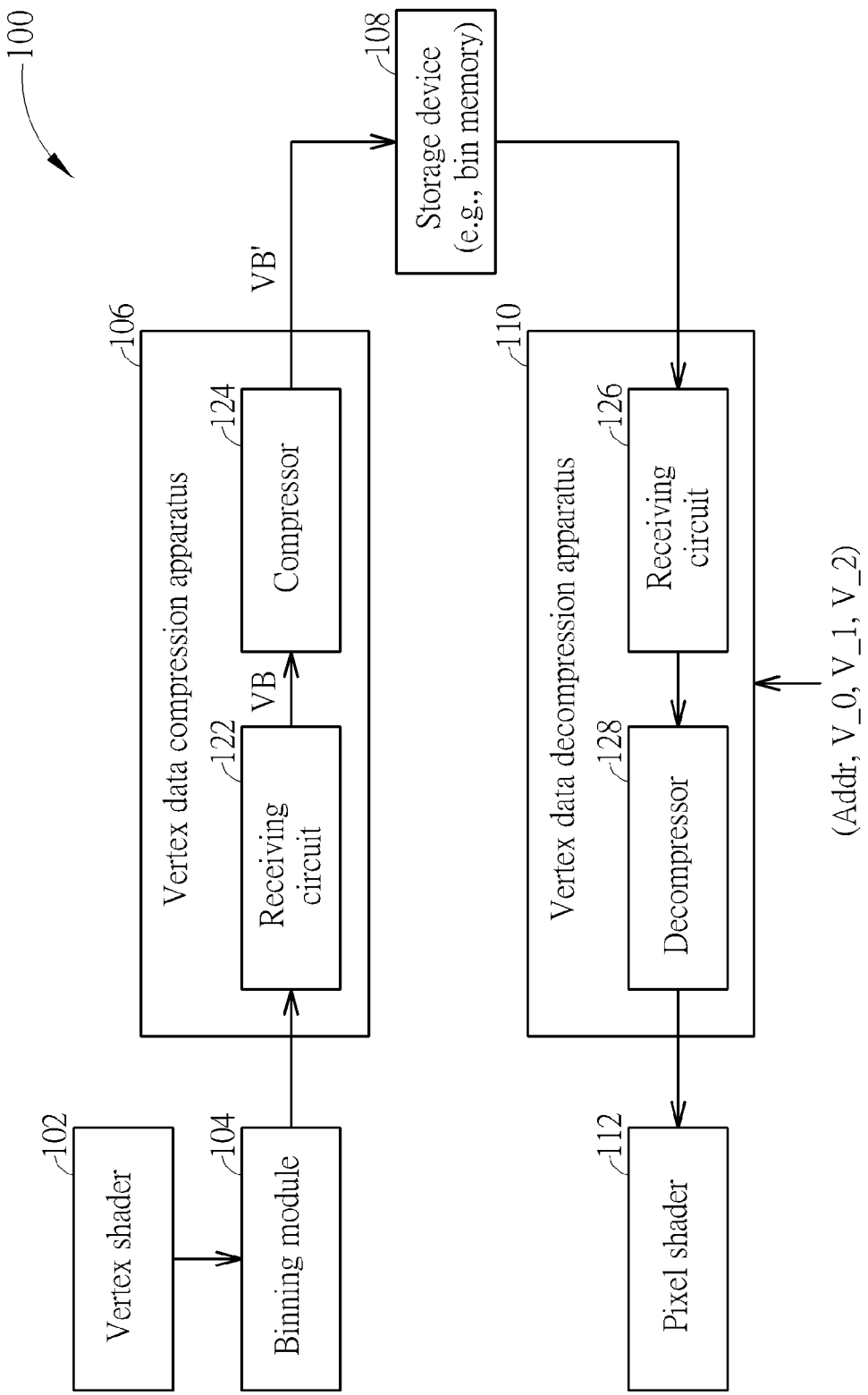
FIG. 1 is a block diagram illustrating a graphics processing system according to an embodiment of the present invention.

FIG. 1 is a block diagram illustrating a graphics processing system according to an embodiment of the present invention. At least a portion of the graphics processing system 100 may be part of a graphics processing unit (GPU) used in an electronic device, and may include a vertex shader 102, a binning module 104, a vertex data compression apparatus 106, a storage device 108, a vertex data decompression apparatus 110, and a pixel shader 112. It should be noted that only the components pertinent to the present invention are shown in FIG. 1. In practice, the graphics processing system 100 may include additional components to achieve other functions. The vertex data compression apparatus 106 is implemented to apply data compression to raw vertex data received from a preceding three-dimensional (3D) graphics processing pipeline stage (e.g., binning module 104) and store compressed/encoded vertex data into the storage device (e.g., an off-chip bin memory) 108, and includes a receiving circuit 122 and a compressor 124. The vertex data decompression apparatus 110 is implemented to perform data decompression to compressed/encoded vertex data read from the storage device 108 and output decompressed/decoded vertex data to a following 3D graphics processing pipeline stage (e.g., pixel shader 112), and includes a receiving circuit 126 and a decompressor 128. Since compressed vertex data is stored into the storage device 108 at the VP pass and read from the storage device 108 at the PP pass, the memory traffic and memory space requirement can be reduced.

The vertex shader 102, binning module 104, vertex data compression apparatus 106, vertex data decompression apparatus and pixel shader 112 may be implemented using programmable processing circuitry. The vertex shader 102 may be arranged to perform vertex position shading (i.e., vertex position computation) and vertex attribute shading (i.e., vertex attribute computation) at a binning process (i.e., a vertex phase (VP) pass). The pixel shader 112 may be arranged to perform pixel (fragment) shading at a rendering process (i.e., a pixel phase (PP) pass) after the binning process. In this embodiment, the pixel shader 112 may be arranged to employ a bin-based rendering scheme. Hence, at the VP pass, the binning module 104 may divide a screen space (i.e., one frame) into a plurality of bins according to the vertex position information given by the vertex position shading performed by the vertex shader 102. Specifically, concerning each primitive having vertices processed by the preceding vertex shader 102 and required to be processed by the following pixel shader 112, the binning module 104 may check distribution of the primitive in the screen space to find out bin(s) covered by the primitive, and then outputs vertex data of each bin covered by the primitive, where the vertex data may include vertex position data and associated vertex attribute data. Since the present invention focuses on vertex data compression and decompression, further description of vertex shader 102, binning module 104 and pixel shader 112 is omitted here for brevity.

Regarding the vertex data compression apparatus 106, the receiving circuit 122 is arranged to collect/group a plurality of vertices as one vertex block VB. For example, every 16 vertices will be grouped together as one vertex block VB to serve as one compression unit processed by the compressor 124. When the number of remaining vertices is smaller than 16, one vertex block VB may be generated by collecting/grouping the remaining vertices only. Each vertex in the vertex block VB may have a plurality of 32-bit vertex components, including vertex component(s) recording the vertex position (e.g., X-coordinate value and Y-coordinate value) and vertex component(s) recording vertex attributes (e.g., Z-coordinate value, W-coordinate value, R (red color channel) value, G (green color channel) value, B (blue color channel) value, etc.). The compressor 124 is coupled to the receiving circuit 122 and arranged to extract at least one data unit array (e.g., at least one nibble array) from the vertex block VB, where each data unit array is composed of data units selected from vertex components of the vertices respectively, the data units correspond to the same channel, and each of the data units is smaller than one byte. For example, each vertex component may have a plurality of nibbles corresponding to a plurality of nibble channels, each data unit may be one nibble extracted from one of the nibble channels, and each data unit array is one nibble array composed of nibbles that are extracted from the same nibble channel in vertex components of different vertices. To put it simply, M consecutive bits in one 32-bit vertex component may be collected as one data unit, where M≤4. If the vertex block VB has N vertices, the size of each data unit array extracted from the vertex block VB is M×N, where N≤16.

Figure 2:
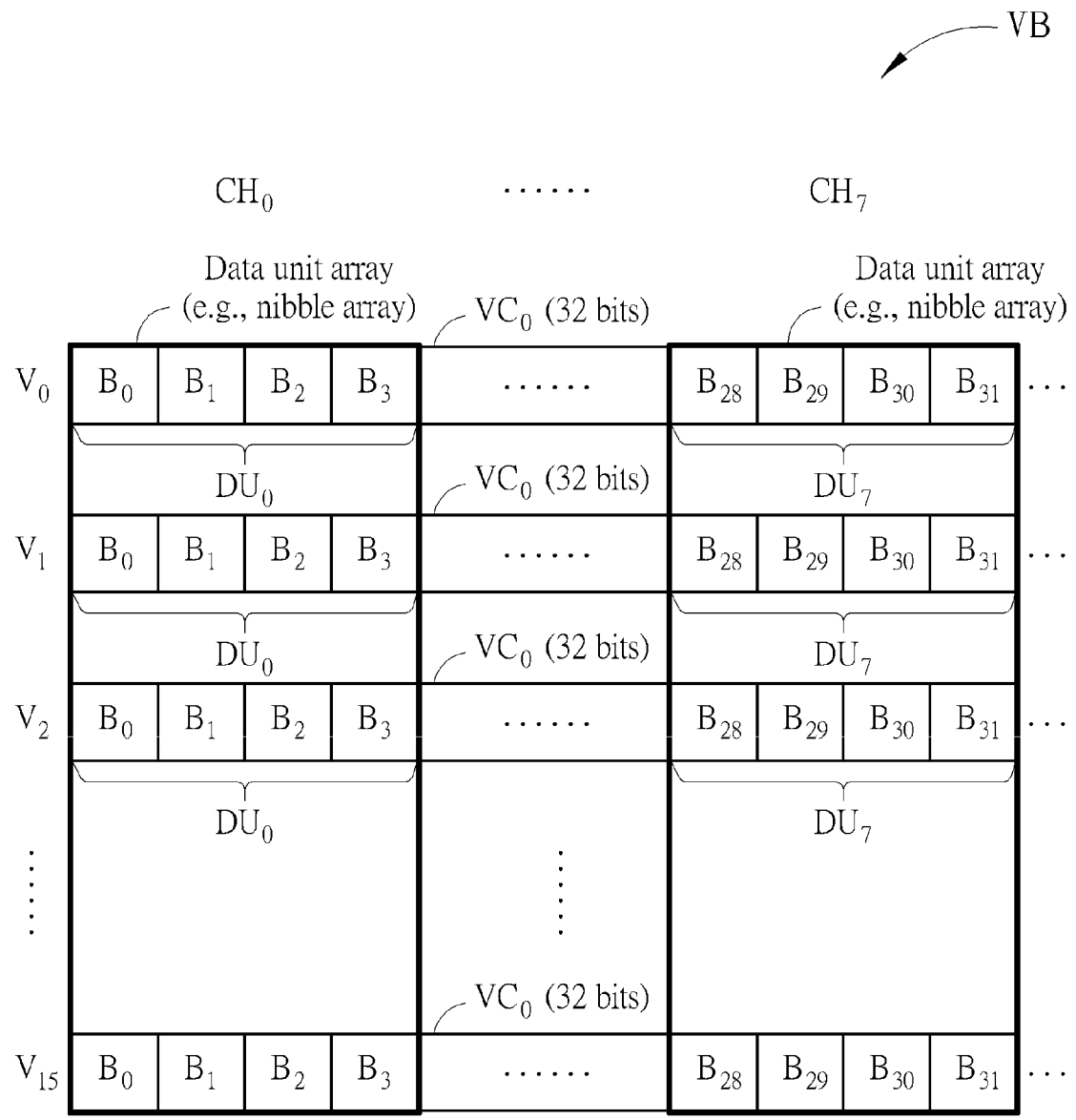
FIG. 2 is a diagram illustrating an example of extracting data unit arrays from vertex components of vertices in a vertex block.

FIG. 2 is a diagram illustrating an example of extracting data unit arrays from vertex components of vertices in a vertex block. In this example, one vertex block VB includes 16 vertices $V_0$-$V_{15}$ each having a plurality of 32-bit vertex components. Taking the vertex component $VC_0$ of each of the vertices $V_0$-$V_{15}$ for example, it has a plurality of data units corresponding to a plurality of channels. In a case where each data unit is one nibble (4 bits), the vertex component $VC_0$ of each of the vertices $V_0$-$V_{15}$ has 32 bits $B_0$-$B_{31}$, and is regarded as having 8 data units (nibbles) $DU_0$-$DU_7$ corresponding to 8 channels $CH_0$-$CH_7$ respectively. The compressor 124 may extract a data unit array (e.g., nibble array) composed of data units (e.g., nibbles) that are selected from vertex components of the vertices $V_0$-$V_{15}$ and correspond to the same channel (e.g., nibble channel). For example, when the channel $CH_0$ is selected for vertex data compression, the data unit array composed of data units DU0 selected from vertex components $VC_0$ of all vertices $V_0$-$V_{15}$ is extracted. For another example, when the channel $CH_7$ is selected for vertex data compression, the data unit array composed of data units DU7 selected from vertex components $VC_0$ of all vertices $V_0$-$V_{15}$ is extracted.

With regard to each extracted data unit array, the compressor 124 is further arranged to check data units of the extracted data unit array to select a compression algorithm, and compress data units of the extracted data unit array according to the selected compression algorithm. That is, the compression algorithm is selected from a plurality of pre-defined compression algorithms based on the channel property. In this embodiment, the compressor 124 may perform a classifying operation to classify values possessed by data units of the extracted data unit array into at least one cluster, and refer to the at least one cluster found by the classifying operation to determine the compression algorithm. The clustering operation is successful when the number of clusters determined by the classifying operation does not exceed a first predetermined threshold, and each cluster determined by the classifying operation step has a value deviation does not exceed a second predetermined threshold. For example, the first predetermined threshold may be set by 4, and the second predetermined threshold may be set by 3. Hence, the compressor 124 may find up to 4 clusters each having data deviation that is at most 3. However, this is for illustrative purposes only, and is not meant to be a limitation of the present invention. Based on the clustering result of values possessed by data units of the extracted data unit array, the compressor 124 decides whether to apply data compression to the extracted data unit array. When the clustering operation can find valid cluster(s) successfully, the compressor 124 selects one of a plurality of pre-defined compression algorithms, such as "unique nibble (un)"-type compression, "limited range"-type compression or "common nibble (cn)"-type compression, and uses the selected compression algorithm for compressing values possessed by data units of the extracted data unit array. However, when the clustering operation fails to find any valid cluster, the data compression is bypassed, such that original values possessed by data units of the extracted data unit array are kept in the output of the compressor 124. The compressor 124 generates a compressed vertex block VB' to the storage device 108 according to the raw vertex block VB, where at least one data unit array (e.g., at least one nibble array) of the vertex block VB is compressed through a selected compression algorithm. Further description of the proposed compression algorithms is described as below.

When values possessed by data units of the extracted data unit array are classified into only a single cluster having only a single value, a "un"-type compression is employed by the compressor 124 to compress the values possessed by data units of the extracted data unit array. Take the data unit array composed of data units DU7 of vertex components $VC_0$ of vertices V0-V15 as shown in FIG. 2 for example. If the data units DU7 of vertex components $VC_0$ of vertices V0-V15 have the same value (e.g., "0x3"), the clustering result of values possessed by data units DU7 of vertex components $VC_0$ of vertices V0-V15 will have only a single cluster having only a single value "0x3". The compressor 124 records the 4-bit value "0x3" and one 3-bit type value indicative of the compression type "un" in a header part of the compressed vertex block VB', where none of the values "0x3" possessed by data units DU7 of vertex components $VC_0$ of vertices V0-V15 is recorded in a body part of the compressed vertex block VB'. In other words, each of the values "0x3" possessed by data units DU7 is shrank into a 0-bit data, and is not recorded in the body part of the compressed vertex block VB'. When no vertex data compression is enabled, storing one uncompressed data unit array requires a memory space of (4*16) bits, where 4 is the number of bits in one data unit, and 16 is the number of vertices in one vertex block. However, when the proposed "un"-type compression algorithm is enabled, storing one compressed data unit array requires a memory space of (4+3) bits only, where 4 is the number of bits needed to record one unique data unit (e.g., "0x3"), and 3 is the number of bits needed to record the associated compression type. Hence, the compression rate (CR) is (4+3)/(4*16)= 10.9%.

When values possessed by data units of the extracted data unit array are classified into only a single cluster having a plurality of consecutive values, a "limited range"-type compression is employed by the compressor 124 to compress the values possessed by data units of the extracted data unit array. Take the data unit array composed of data units DU7 of vertex components $VC_0$ of vertices V0-V15 as shown in FIG. 2 for example. Consider a case where the data units DU7 of vertex components $VC_0$ of vertices V0-V15 have 4 consecutive values in a limited range (e.g., {0x5, 0x8}), the clustering result of values possessed by data units DU7 of vertex components $VC_0$ of vertices V0-V15 will have only a single cluster having multiple consecutive values "0x5", "0x6", "0x7" and "0X8" with a maximum deviation equal to 3. The compressor 124 therefore selects a "range1_2" compression algorithm, where the first index "1" represents the number of ranges (i.e., clusters), and the second index "2" represents the number of bits needed to indicate the maximum deviation. Hence, the compressor 124 records a specific value (e.g., a range start value "0x5") selected from the values of the single cluster and a 3-bit type value indicative of the compression type "range1_2" in a header part of the compressed vertex block VB'. With regard to each of the values possessed by data units in the extracted data unit array, the compressor 124 records a 2-bit deviation value between the specific value (e.g., range start value "0x5") and the value possessed by a data unit in a body part of the compressed vertex block VB', where the value possessed by the data unit is not recorded in the body part of the compressed vertex block VB'. If a value possessed by one of the data units in the extracted data unit array is "0x5", the original 4-bit value "0x5" is shrank into a 2-bit deviation value "b00", and the 2-bit deviation value "b00" is recorded in the body part of the compressed vertex block VB'. If a value possessed by one of the data units in the extracted data unit array is "0x6", the original 4-bit value "0x6" is shrank into a 2-bit deviation value "b01", and the 2-bit deviation value "b01" is recorded in the body part of the compressed vertex block VB'. If a value possessed by one of the data units in the extracted data unit array is "0x7", the original 4-bit value "0x7" is shrank into a 2-bit deviation value "b10", and the 2-bit deviation value "b10" is recorded in the body part of the compressed vertex block VB'. If a value possessed by one of the data units in the extracted data unit array is "0x8", the original 4-bit value "0x8" is shrank into a 2-bit deviation value "b11", and the 2-bit deviation value "b11" is recorded in the body part of the compressed vertex block VB'. When no vertex data compression is enabled, storing one uncompressed data unit array requires a memory space of (4*16) bits, where 4 is the number of bits in one data unit, and 16 is the number of vertices in one vertex block. However, when the proposed "range1_2" compression algorithm is enabled, storing one compressed data unit array requires a memory space of [(4+3)+2*16] bits only, where 4 is the number of bits needed to record one of the consecutive values in the single cluster (e.g., "0x5"), 3 is the number of bits needed to record the associated compression type, 2 is the number of bits needed to record the deviation value, and 16 is the number of vertices in one vertex block. Hence, the compression rate (CR) is [(4+3)+2*16]/(4*16)= 60.9%.

In addition to the aforementioned "range1_2" compression algorithm selected for the case that there is only a single cluster having multiple consecutive values, the "limited range"-type compression may support other compression algorithms such as "range1_1" compression algorithm and "range1_3" compression algorithm.

Consider a case where the data units DU7 of vertex components $VC_0$ of vertices V0-V15 have 2 consecutive values in a limited range (e.g., {0x5, 0x6}), the clustering result of values possessed by data units DU7 of vertex components $VC_0$ of vertices V0-V15 will have only a single cluster having multiple consecutive values "0x5" and "0x6" with a maximum deviation equal to 1. The compressor 124 therefore selects a "range1_1" compression algorithm, where the first index "1" represents the number of ranges (i.e., clusters), and the second index "1" represents the number of bits needed to indicate the maximum deviation. Hence, the compressor 124 records a specific value (e.g., range start value "0x5") selected from the values of the single cluster and a 3-bit type value indicative of the compression type "range1_1" in a header part of the compressed vertex block VB'. With regard to each of the values possessed by data units in the extracted data unit array, the compressor 124 records a 1-bit deviation value between the specific value (e.g., range start value "0x5") and the value possessed by a data unit in a body part of the compressed vertex block VB', where the value possessed by the data unit is not recorded in the body part of the compressed vertex block VB'. If a value possessed by one of the data units in the extracted data unit array is "0x5", the original 4-bit value "0x5" is shrank into a 1-bit deviation value "b0", and the 1-bit deviation value "b0" is recorded in the body part of the compressed vertex block VB'. If a value possessed by one of the data units in the extracted data unit array is "0x6", the original 4-bit value "0x6" is shrank into a 1-bit deviation value "b1", and the 1-bit deviation value "b1" is recorded in the body part of the compressed vertex block VB'. Hence, the compression rate (CR) is [(4+3)+1*16]/(4*16)=35.9%.

Consider another case where the data units DU7 of vertex components $VC_0$ of vertices V0-V15 have 5 consecutive values in a limited range (e.g., {0x5, 0x9}), the clustering result of values possessed by data units DU7 of vertex components $VC_0$ of vertices V0-V15 will have only a single cluster having multiple consecutive values "0x5", "0x6", "0x7", "0x8", "0x9" with a maximum deviation equal to 4. The compressor 124 therefore selects a "range1_3" compression algorithm, where the first index "1" represents the number of ranges (i.e., clusters), and the second index "3" represents the number of bits needed to indicate the maximum deviation. Hence, the compressor 124 records a specific value (e.g., range start value "0x5") selected from the values of the single cluster and a 3-bit type value indicative of the compression type "range1_3" in a header part of the compressed vertex block VB'. With regard to each of the values possessed by data units in the extracted data unit array, the compressor 124 records a 3-bit deviation value between the specific value (e.g., range start value "0x5") and the value possessed by a data unit in a body part of the compressed vertex block VB', where the value possessed by the data unit is not recorded in the body part of the compressed vertex block VB'. If a value possessed by one of the data units in the extracted data unit array is "0x5", the original 4-bit value "0x5" is shrank into a 3-bit deviation value "b000", and the 3-bit deviation value "b000" is recorded in the body part of the compressed vertex block VB'. If a value possessed by one of the data units in the extracted data unit array is "0x6", the original 4-bit value "0x6" is shrank into a 3-bit deviation value "b001", and the 3-bit deviation value "b001" is recorded in the body part of the compressed vertex block VB'. If a value possessed by one of the data units in the extracted data unit array is "0x7", the original 4-bit value "0x7" is shrank into a 3-bit deviation value "b010", and the 3-bit deviation value "b010" is recorded in the body part of the compressed vertex block VB'. If a value possessed by one of the data units in the extracted data unit array is "0x8", the original 4-bit value "0x8" is shrank into a 3-bit deviation value "b011", and the 3-bit deviation value "b011" is recorded in the body part of the compressed vertex block VB'. If a value possessed by one of the data units in the extracted data unit array is "0x9", the original 4-bit value "0x9" is shrank into a 3-bit deviation value "b100", and the 3-bit deviation value "b100" is recorded in the body part of the compressed vertex block VB'. Hence, the compression rate (CR) is [(4+3)+3*16]/(4*16)=85.9%.

When values possessed by data units of the extracted data unit array are classified into a plurality of clusters each having a plurality of consecutive values, a "limited range"-type compression is employed by the compressor 124 to compress the values possessed by data units of the extracted data unit array. Take the data unit array composed of data units DU7 of vertex components $VC_0$ of vertices V0-V15 as shown in FIG. 2 for example. Consider a case where the data units DU7 of vertex components $VC_0$ of vertices V0-V15 have a group of 4 consecutive values in a limited range (e.g., {0x5, 0x8}) and a group of 4 consecutive values in a different limited range (e.g., {0xa, 0xc}), the clustering result of values possessed by data units DU7 of vertex components $VC_0$ of vertices V0-V15 will have two clusters, one having multiple consecutive values "0x5", "0x6", "0x7" and "0X8" with a maximum deviation equal to 3 and another having multiple consecutive values "0xa", "0xb" and "0xc" with a maximum deviation equal to 2. The compressor 124 therefore selects a "range2_2" compression algorithm, where the first index "2" represents the number of ranges (i.e., clusters), and the second index "2" represents the number of bits needed to indicate the maximum deviation for each range. Hence, the compressor 124 records a specific value (e.g., range start value "0x5") selected from the values of one single cluster, a specific value (e.g., range start value "0xa") selected from the values of the other single cluster, and a 3-bit type value indicative of the compression type "range2_2" in a header part of the compressed vertex block VB'. With regard to each of the values possessed by data units in the extracted data unit array, the compressor 124 records a 1-bit index value of a cluster associated with the value possessed by a data unit in a body part of the compressed vertex block CB', and further records a 2-bit deviation value between the specific value (e.g., "0x5" or "0xa") of the associated cluster and the value possessed by the data unit in the body part of the compressed vertex block VB', where the value possessed by the data unit is not recorded in the body part of the compressed vertex block VB'.

If a value possessed by one of the data units in the extracted data unit array is "0x5", the original 4-bit value "0x5" is shrank into a 1-bit index value "b0" of the associated cluster/range {0x5, 0x8} and a 2-bit deviation value "b00", and the 1-bit index value "b0" and the 2-bit deviation value "b00" are both recorded in the body part of the compressed vertex block VB'. If a value possessed by one of the data units in the extracted data unit array is "0x6", the original 4-bit value "0x6" is shrank into a 1-bit index value "b0" of the associated cluster/range {0x5, 0x8} and a 2-bit deviation value "b01", and the 1-bit index value "b0" and the 2-bit deviation value "b01" are both recorded in the body part of the compressed vertex block VB'. If a value possessed by one of the data units in the extracted data unit array is "0x7", the original 4-bit value "0x7" is shrank into a 1-bit index value "b0" of the associated cluster/range {0x5, 0x8} and a 2-bit deviation value "b10", and the 1-bit index value "b0" and the 2-bit deviation value "b10" are both recorded in the body part of the compressed vertex block VB'. If a value possessed by one of the data units in the extracted data unit array is "0x8", the original 4-bit value "0x8" is shrank into a 1-bit index value "b0" of the associated cluster/range {0x5, 0x8} and a 2-bit deviation value "b11", and the 1-bit index value "b0" and the 2-bit deviation value "b11" are both recorded in the body part of the compressed vertex block VB'.

If a value possessed by one of the data units in the extracted data unit array is "0xa", the original 4-bit value "0xa" is shrank into a 1-bit index value "b1" of the associated cluster/range {0xa, 0xc} and a 2-bit deviation value "b00", and the 1-bit index value "b1" and the 2-bit deviation value "b00" are both recorded in the body part of the compressed vertex block VB'. If a value possessed by one of the data units in the extracted data unit array is "0xb", the original 4-bit value "0xb" is shrank into a 1-bit index value "b1" of the associated cluster/range {0xa, 0xc} and a 2-bit deviation value "b01", and the 1-bit index value "b1" and the 2-bit deviation value "b01" are both recorded in the body part of the compressed vertex block VB'. If a value possessed by one of the data units in the extracted data unit array is "0xc", the original 4-bit value "0xc" is shrank into a 1-bit index value "b1" of the associated cluster/range {0xa, 0xc} and a 2-bit deviation value "b10", and the 1-bit index value "b1" and the 2-bit deviation value "b10" are both recorded in the body part of the compressed vertex block VB'.

When no vertex data compression is enabled, storing one uncompressed data unit array requires a memory space of (4*16) bits, where 4 is the number of bits in one data unit, and 16 is the number of vertices in one vertex block. However, when the proposed "range2_2" compression algorithm is enabled, storing one compressed data unit array requires a memory space of [(4*2+3)+(2+1)*16] bits only. Hence, the compression rate (CR) is [(4*2+3)+(2+1)*16]/(4*16)=92.1%.

In addition to the aforementioned "range2_2" compression algorithm selected for the case that there are multiple clusters each having multiple values, the "limited range"-type compression may support other compression algorithms such as "range2_1" compression algorithm. Consider a case where the data units DU7 of vertex components VC$_0$ of vertices V0-V15 have a group of 2 consecutive values in a limited range (e.g., {0x5, 0x6}) and a group of 2 consecutive values in a different limited range (e.g., {0xa, 0xb}), the clustering result of values possessed by data units DU7 of vertex components VC$_0$ of vertices V0-V15 will have two clusters, one having multiple consecutive values "0x5" and "0x6" with a maximum deviation equal to 1 and another having multiple consecutive values "0xa" and "0xb" with a maximum deviation equal to 1. The compressor 124 therefore selects a "range2_1" compression algorithm, where the first index "2" represents the number of ranges (i.e., clusters), and the second index "1" represents the number of bits needed to indicate the maximum deviation for each range. Hence, the compressor 124 records a specific value (e.g., range start value "0x5") selected from the values of one single cluster, a specific value (e.g., range start value "0xa") selected from the values of the other single cluster, and a 3-bit type value indicative of the compression type "range1_1" in a header part of the compressed vertex block VB'. With regard to each of the values possessed by data units in the extracted data unit array, the compressor 124 records a 1-bit index value of a cluster associated with the value possessed by a data unit in a body part of the compressed vertex block CB', and further records a 1-bit deviation value between the specific value (e.g., "0x5" or "0xa") of the associated cluster and the value possessed by the data unit in the body part of the compressed vertex block VB', where the value possessed by the data unit is not recorded in the body part of the compressed vertex block VB'.

If a value possessed by one of the data units in the extracted data unit array is "0x5", the original 4-bit value "0x5" is shrank into a 1-bit index value "b0" of the associated cluster/range {0x5, 0x6} and a 1-bit deviation value "b0", and the 1-bit index value "b0" and the 1-bit deviation value "b0" are both recorded in the body part of the compressed vertex block VB'. If a value possessed by one of the data units in the extracted data unit array is "0x6", the original 4-bit value "0x6" is shrank into a 1-bit index value "b0" of the associated cluster/range {0x5, 0x6} and a 1-bit deviation value "b1", and the 1-bit index value "b0" and the 1-bit deviation value "b1" are both recorded in the body part of the compressed vertex block VB'. If a value possessed by one of the data units in the extracted data unit array is "0xa", the original 4-bit value "0xa" is shrank into a 1-bit index value "b1" of the associated cluster/range {0xa, 0xb} and a 1-bit deviation value "b0", and the 1-bit index value "b1" and the 1-bit deviation value "b0" are both recorded in the body part of the compressed vertex block VB'. If a value possessed by one of the data units in the extracted data unit array is "0xb", the original 4-bit value "0xb" is shrank into a 1-bit index value "b1" of the associated cluster/range {0xa, 0xb} and a 1-bit deviation value "b1", and the 1-bit index value "b1" and the 1-bit deviation value "b1" are both recorded in the body part of the compressed vertex block VB'. Hence, the compression rate (CR) is [(4*2+3)+(1+1)*16]/(4*16)=67.1%.

When values possessed by data units of the extracted data unit array are classified into a plurality of clusters each having only a single value, a "cn"-type compression is employed by the compressor 124 to compress the values possessed by data units of the extracted data unit array. Take the data unit array composed of data units DU7 of vertex components VC$_0$ of vertices V0-V15 as shown in FIG. 2 for example. Consider a case where the data units DU7 of vertex components VC$_0$ of vertices V0-V15 have 4 distinct values 0x4, 0x8, 0xa, 0xf only, the clustering result of values possessed by data units DU7 of vertex components VC$_0$ of vertices V0-V15 will have a first cluster with only a single value 0x4, a second cluster with only a single value 0x8, a third cluster with only a single value 0xa, and a fourth cluster with only a single value 0xf. The compressor 124 therefore selects a "cn4" compression algorithm, where the index "4" represents the number of distinct values shared by data units in one data unit array. Hence, the compressor 124 records the distinct values 0x4, 0x8, 0xa, 0xf of different clusters and a 3-bit type value indicative of the compression type "cn4" in a header part of the compressed vertex block VB'. With regard to each of the values possessed by data units in the extracted data unit array, the compressor 124 records a 2-bit index value of a cluster associated with the value possessed by a data unit in a body part of the compressed vertex block CB', where the value possessed by the data unit is not recorded in the body part of the compressed vertex block VB'. If a value possessed by one of the data units in the extracted data unit array is "0x4", the original 4-bit value "0x4" is shrank into a 2-bit index value "b00" of the associated cluster [0x4], and the 2-bit index value "b00" is recorded in the body part of the compressed vertex block VB'. If a value possessed by one of the data units in the extracted data unit array is "0x8", the original 4-bit value "0x8" is shrank into a 2-bit index value "b01" of the associated cluster [0x8], and the 2-bit index value "b01" is recorded in the body part of the compressed vertex block VB'. If a value possessed by one of the data units in the extracted data unit array is "0xa", the original 4-bit value "0xa" is shrank into a 2-bit index value "b10" of the associated cluster [0xa], and the 2-bit index value "b10" is recorded in the body part of the compressed vertex block VB'. If a value possessed by one of the data units in the extracted data unit array is "0xf", the original 4-bit value "0xf" is shrank into a 2-bit index value "b11" of the associated cluster [0xf], and the 2-bit index value "b11" is recorded in the body part of the compressed vertex block VB'.

When no vertex data compression is enabled, storing one uncompressed data unit array requires a memory space of (4*16) bits, where 4 is the number of bits in one data unit, and 16 is the number of vertices in one vertex block. However, when the proposed "cn3" compression algorithm is enabled, storing one compressed data unit array requires a memory space of [(4*4+3)+2*16] bits only. Hence, the compression rate (CR) is [(4*4+3)+2*16]/(4*16)=79.6%.

In addition to the aforementioned "cn4" compression algorithm selected for the case that there are multiple clusters each having multiple values, the 'cn'-type compression may support other compression algorithms such as "cn3" compression algorithm. Consider a case where the data units DU7 of vertex components VC₀ of vertices V0-V15 have 3 distinct values 0x4, 0x8 and 0xa only, the clustering result of values possessed by data units DU7 of vertex components VC₀ of vertices V0-V15 will have a first cluster with only a single value 0x4, a second cluster with only a single value 0x8, and a third cluster with only a single value 0xa. The compressor 124 therefore selects a "cn3" compression algorithm, where the index "3" represents the number of distinct values shared by data units in one data unit array. Hence, the compressor 124 records the distinct values 0x4, 0x8, 0xa of different clusters and a 3-bit type value indicative of the compression type "cn3" in a header part of the compressed vertex block VB'. With regard to each of the values possessed by data units in the extracted data unit array, the compressor 124 records a 2-bit index value of a cluster associated with the value possessed by a data unit in a body part of the compressed vertex block CB', where the value possessed by the data unit is not recorded in the body part of the compressed vertex block VB'. If a value possessed by one of the data units in the extracted data unit array is "0x4", the original 4-bit value "0x4" is shrank into a 2-bit index value "b00" of the associated cluster [0x4], and the 2-bit index value "b00" is recorded in the body part of the compressed vertex block VB'. If a value possessed by one of the data units in the extracted data unit array is "0x8", the original 4-bit value "0x8" is shrank into a 2-bit index value "b01" of the associated cluster [0x8], and the 2-bit index value "b01" is recorded in the body part of the compressed vertex block VB'. If a value possessed by one of the data units in the extracted data unit array is "0xa", the original 4-bit value "0xa" is shrank into a 2-bit index value "b10" of the associated cluster [0xa], and the 2-bit index value "b10" is recorded in the body part of the compressed vertex block VB'. Hence, the compression rate (CR) is [(4*3+3)+2*16]/(4*16)=73.4%.

Figure 3:
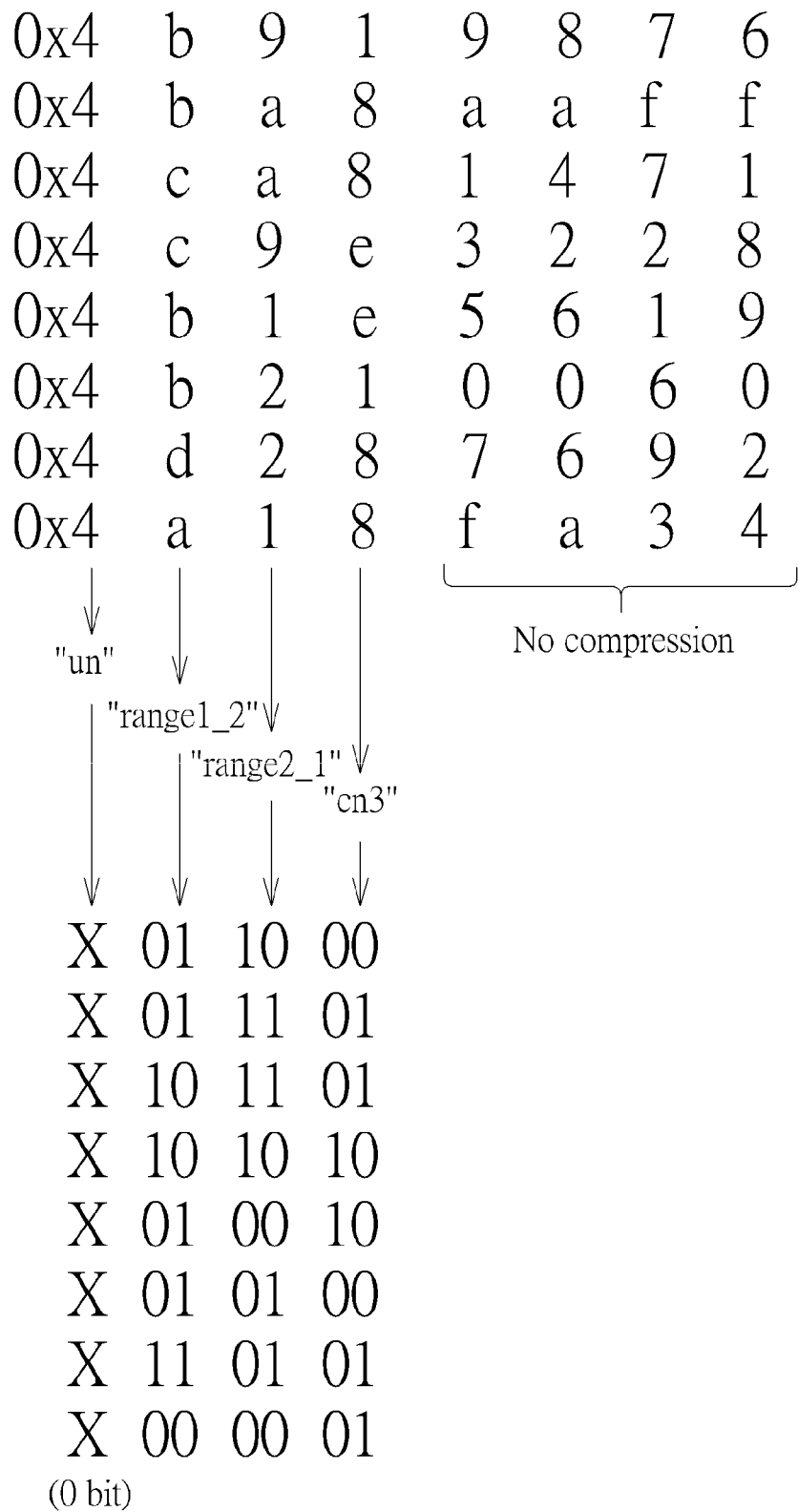
FIG. 3 is a diagram illustrating an example of compressing vertex components of eight vertices.

For better understanding of technical features of the proposed vertex data compression, an example of compressing 32-bit vertex components (e.g., R components) of 8 vertices is illustrated in FIG. 3. Bits [31:28] are "0x4" for all vertices. Hence, the "un"-type compression algorithm is selected and employed to store "0x4" in a header part of a compressed vertex block as a unique nibble value, and store no bits in a body part of the compressed vertex block. Bits [27:24] are ranged from {0xa, 0xd}. Hence, the "range1_2" compression algorithm is selected and employed to store "0xa" in the header part of the compressed vertex block as a range start value, and store 2-bit deviation value in the body part of the compressed vertex block. Since a=a+0, b=a+1, c=a+2 and d=a+3, the nibble array [0xb, 0xb, 0xc, 0xc, 0xb, 0xb, 0xd, 0xa] of the nibble channel [27:24] is encoded into [01, 01, 10, 10, 01, 01, 11, 00]. Bits [23:20] are ranged from {0x1, 0x2} and {0x9, 0xa}. Hence, the "range2_1" compression algorithm is selected and employed to store "0x1" and "0x9" in the header part of the compressed vertex block as two range start values, store a 1-bit index value in the body part of the compressed vertex block for range selection, and store a 1-bit deviation value in the body part of the compressed vertex block. Since {0x1, 0x2} is the first range, {0x9, 0xa} is the second range and a=a+1, 9=a+1, 1=1+0 and 2=1+1, the nibble array [0x9, 0x1, 0x1, 0x9, 0x1, 0x2, 0x2, 0x1] of the nibble channel [23:20] is encoded into [10, 11, 11, 10, 00, 01, 01, 00], where the first bit in each 2-bit array element is an index value, and the second bit in each 2-bit array element is a deviation value. Bits [19:16] have 3 common nibbles "0x1", "0x8" and "0xe". Hence, the "cn3" compression algorithm is selected and employed to store the common nibbles "0x1", "0x8" and "0xe" in the header part of the compressed vertex block, and store a 2-bit index value in the body part of the compressed vertex block. Since "0x1" is the first common nibble, "0x8" is the second common nibble and "0xe" is the third common nibble, the nibble array [0x1, 0x8, 0x8, 0xe, 0xe, 0x1, 0x8, 0x8] of the nibble channel [19:16] is encoded into [00, 01, 01, 10, 10, 00, 01, 01]. Since bits [15:0] are not compressible, the data compression is skipped. A 1-but type value (e.g., "b1") is stored in the header part of the compressed vertex block, and bits [15:0] are stored in the body part of the compressed vertex block.

The header part of the compressed vertex block stores compression types followed by values (e.g., unique nibble, common nibbles, base values of limited ranges). In this example, the header part of the compressed vertex block may store {"un", "range1_2", "range2_1", "cn3", 0x4, 0xa, 0x1, 0x9, 0x1, 0x8, 0xe}, where each of the compression types "un", "range1_2", "range2_1" and "cn3" may be further encoded with, say, 3 bits.

As mentioned above, when values possessed by data units of the extracted data unit array are classified into only a single cluster having only a single value, a "un"-type compression is employed by the compressor 124, such that a value (e.g., a 4-bit value) shared by all data units of the extracted data unit array plus associated compression type information (e.g., a 3-bit value) are recorded in the header part of the compressed vertex block VB'. When data unit arrays of all channels $CH_0$-$CH_7$ are extracted for data compression and values possessed by data units of each of the extracted data unit arrays are classified into only a single cluster having only a single value (i.e., with regard to each of the extracted data unit arrays corresponding to channels $CH_0$-$CH_7$, values possessed by data units that correspond to the same channel are the same), the "un"-type compression employed by the compressor 124 records 8*(4+3) bits in the header part of the compressed vertex block VB'. To improve the compression efficiency under this condition that the vertex components $VC_0$ of the vertices $V_0$-$V_{15}$ are identical to one another, the present invention further proposes a "unique component (un)"-type compression algorithm. When the "uc"-type compression algorithm is selected, the compressor 124 records a 32-bit value equal to any of the vertex components $VC_0$ of the vertices $V_0$-$V_{15}$ and a 1-bit type value (e.g., uc=1) in the header part, wherein none of the vertex components $VC_0$ of the vertices $V_0$-$V_{15}$ is recorded in the body part of the compressed vertex block VB'. Compared to the "un"-type compression algorithm that needs to store 8*(4+3) bits in the header part of the compressed vertex block VB', the "uc"-type compression algorithm only stores (32+1) bits in the header part of the compressed vertex block VB'. It should be noted that the "uc"-type compression algorithm may be optional. That is, in an alternative design, the "uc"-type compression algorithm may be omitted, depending upon actual design consideration.

The vertex component $VC_0$ shown in FIG. 2 may be one of vertex components of a vertex included in the vertex block VB. For example, the vertex component $VC_0$ may be a 32-bit vertex attribute component. For another example, the vertex component $VC_0$ may be a 32-bit vertex position component. When X-coordinate values and Y-coordinate values of all vertices in a vertex block can be represented by a 12.4 fixed-point format (i.e., vertices of a vertex block are all within a screen and not in a clipped space), one X-coordinate value and one Y-coordinate value of a vertex may be packed and stored as one 32-bit vertex component, instead of fp32 (clip x) and fp32 (clip y) in the clipped space that are stored as two vertex components separately. However, when X-coordinate values and Y-coordinate values of all vertices in a vertex block cannot be represented by a 12.4 fixed-point format, one X-coordinate value and one Y-coordinate value of a vertex are stored as two vertex components in the clip space (e.g., fp32 (clip x) and fp32 (clip y)) separately.

In one exemplary design, vertex data compression is applied to each channel for compressing data unit arrays (e.g., nibble arrays) extracted from vertex components of vertices in a vertex block. To improve the compression/decompression speed and reduce the hardware cost, the present invention further proposes a channel-selective vertex data compression scheme which applies vertex data compression to certain channels only. For example, the compressor 124 may skip some nibble channels for compression. In this embodiment, the compressor 124 is arranged to determine a plurality of data unit arrays for selective vertex data compression according to a data type of vertex components of vertices in the vertex block VB.

Figure 4:
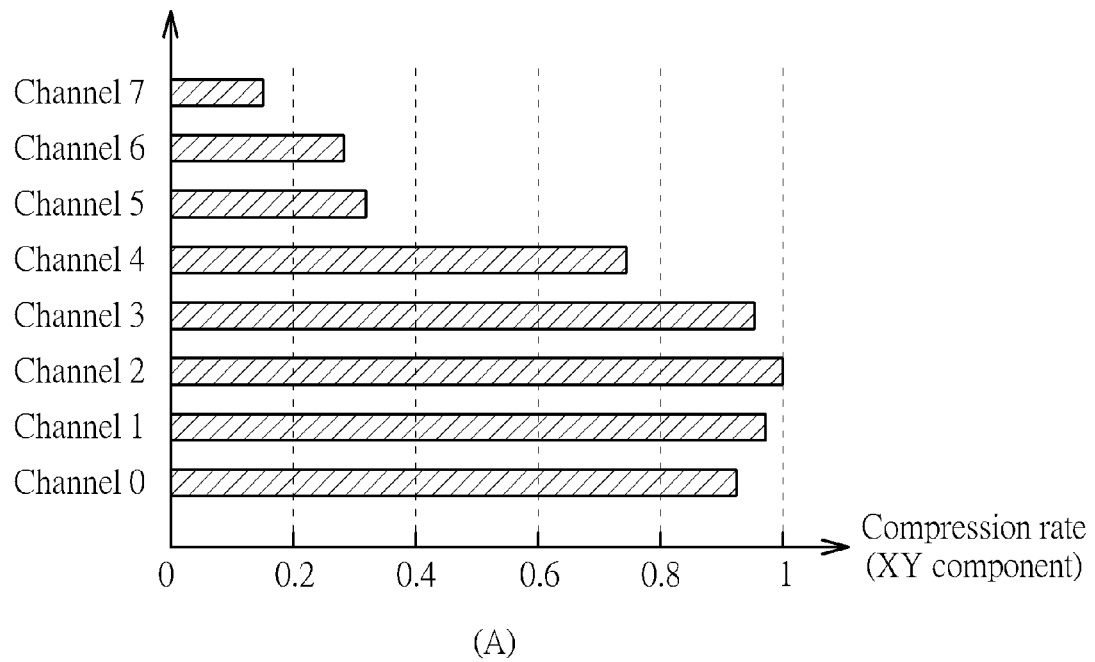
FIG. 4 is a diagram illustrating channelized compression rates of vertex position components and channelized compression rates of vertex attribute components according to an embodiment of the present invention.
Figure 4:
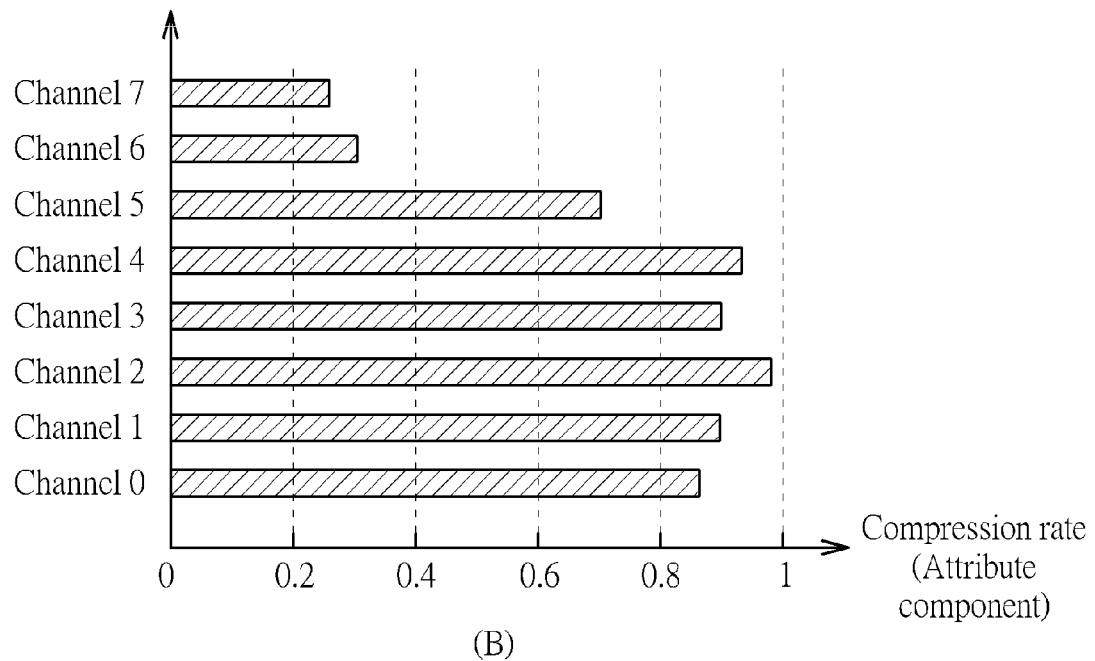

FIG. 4 is a diagram illustrating channelized compression rates of vertex position components and channelized compression rates of vertex attribute components according to an embodiment of the present invention. As can be seen from sub-diagram (A) of FIG. 4, compression rates of 4 MSB channels (i.e., channels 4-7) of a vertex position component are better than compression rates of the remaining channels (i.e., channels 0-3) of the vertex position component. Further, as can be seen from sub-diagram (B) of FIG. 4, compression rates of 3 MSB channels (i.e., channels 5-7) and one LSB channel (i.e., channel 0) of a vertex attribute component are better than compression rates of remaining channels (i.e., channels 1-4) of the vertex position component. Based on above observation, the channel-selective vertex data compression scheme may only compress 4 higher data units (e.g., 4 MSB nibbles) when the vertex component is a vertex position component, and may only compress 3 higher data units (e.g., 3 MSB nibbles) and one lower data unit (e.g., an LSB nibble) when the vertex component is a vertex attribute component. In this way, a balance between the compression speed and the compression quality is achieved.

As mentioned above, the compressed vertex block VB' includes a header part and a body part. In one exemplary design, the header part may be further divided into a fixed-length portion and a variable-length portion. Bit widths of header parts of different compressed vertex blocks may be different from one another due to different compression algorithms used. When each header part is stored using a fixed-length portion and a variable-length portion, bit widths of fixed-length portions of the different compressed vertex blocks are constrained to be the same, but bit widths of variable-length portions of the different compressed vertex blocks are allowed to be different from one another.

Figure 5:
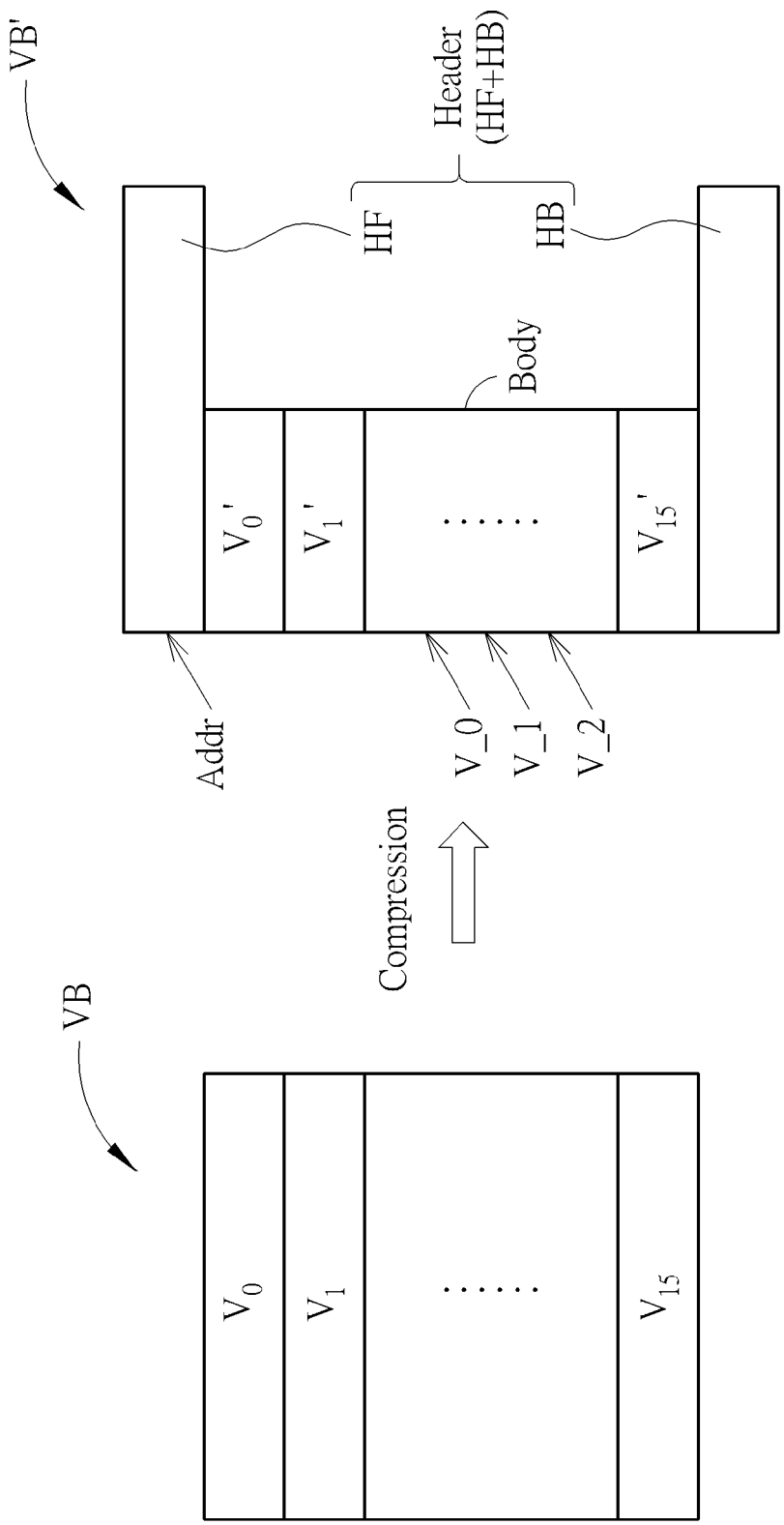
FIG. 5 is a diagram illustrating a data structure of a compressed vertex block according to an embodiment of the present invention.

FIG. 5 is a diagram illustrating a data structure of a compressed vertex block according to an embodiment of the present invention. In one exemplary design, the header part of the compressed vertex block VB' is divided into a header-front (HF) portion preceding the body part and a header-back (HB) portion following the body part, where the header-front portion is the aforementioned fixed-length portion, and the header-back portion is the aforementioned variable-length portion. The compression types (e.g., "un", "uc", "range1_1", "range1_2", range1_3", "range2_1", "range2_2", "cn3", and "cn4") are stored in the header-front portion only. The values (e.g., unique nibbles, common nibbles, base values of limited ranges) are generally stored in the header-back portion. However, a portion of the values (e.g., unique nibbles, common nibbles, base values of limited ranges) may be stored in the header-front portion if the header-front portion still has a free space after all compression types are stored into the header-front portion.

When the compressed vertex block VB' is stored into the storage device 108, the header-front portion, the body part and the header-back portion may be stored in continuous addresses. Since the compressed vertex block VB' begins with the header-front portion and the header-front portion has a fixed bit width, information recorded in the header-front portion can be easily retrieved from the storage device 108. In this embodiment, the header-front portion may include information that can be referenced to decide a bit width of each of compressed vertices $V_0'$-$V_{15}'$ (which may include index values and/or deviation values) in the body part and a bit width of the header-back portion. Hence, the vertex data decompression apparatus 110 may retrieve the header-front portion of the compressed vertex block VB' from the storage device 108, and decode the header-front portion to know the data arrangement of the body part and the header-back portion. After the data arrangement of the body part and the header-back portion in the compressed vertex block VB' is known, the vertex data decompression apparatus 110 can easily find primitive's compressed vertices in the body part and associated values in the header part (e.g., header-front portion and/or header-back portion), and then decompress the compressed vertices to obtain decompressed vertices. Since each compression algorithm used by the compressor 124 is lossless, the decompressed vertices should be identical to the original vertices.

The vertices $V_0$-$V_{15}$ in the vertex block VB are compressed using the same combination of compression algorithms applied to selected channels. Hence, the bit widths of the compressed vertices $V_0'$-$V_{15}'$ are the same. More specifically, each of the compressed vertices $V_0'$-$V_{15}'$ has the same structure and the same stride. This enables random access of compressed vertices $V_0'$-$V_{15}'$ stored in the storage device 108. Further, the proposed vertex data compression and associated vertex data decompression are fairly simple and fast, thus having a negligible impact on the 3D graphics rendering performance.

With regard to the vertex data decompression apparatus 110, the receiving circuit 126 is arranged to receive data read from the compressed vertex block VB', where the compressed vertex block VB' includes a header part and a body part. The compressed vertex block VB' is generated from applying compression to at least one data unit array extracted from the vertex block VB, each data unit array is composed of data units selected from vertex components of vertices in the vertex block VB respectively, the data units correspond to the same channel, and each of the data units is smaller than one byte. The decompressor 128 is arranged to decode the header part for obtaining a recorded value (e.g., a unique component, a unique nibble, a common nibble, or a base value of a limited range), and generate at least a portion of a decompressed vertex component of one vertex based at least partly on the recorded value obtained from the header part.

For example, the vertex data decompression apparatus 110 may receive primitive information (Addr, V_0, V_1, V_2) associated with primitive's vertices. In accordance with the start address Addr of the compressed vertex block VB' stored in the storage device 108, the receiving circuit 126 receives the header-front portion with a fixed bit width (which is a pre-defined value) from the compressed vertex block VB'. The decompressor 128 decodes the received header-front portion to know the data arrangement of the body part and the header-back portion in the compressed vertex block VB', including a bit width of each compressed vertex (i.e., a compressed vertex stride) and a bit width of the header-back portion. Next, based on the compressed vertex stride, the fixed bit width of the header-front portion and the start address Addr of the compressed vertex block VB', the decompressor 122 calculates start addresses of compressed vertices pointed to by the vertex identifiers V_0, V_1, V_2. The receiving circuit 126 receives the desired compressed vertices read from the compressed vertex block VB' according to the calculated start addresses of the desired compressed vertices, and transmits the received compressed vertices to the decompressor 128 for decompression. Next, the decompressor 128 employs decompression algorithms matching compression algorithms used by the compressor 124, and generate decompressed vertices to the pixel shader 112 for pixel (fragment) shading.

If the decompressor 128 refers to a compression type recorded in the header part to determine that the "uc"-type compression algorithm is used for compressing a vertex component of an original vertex, the decompressor 128 decodes the header part (e.g., header-front portion and/or header-back portion) to obtain a recorded value being a complete vertex component (i.e., a unique vertex component), and sets the recorded value obtained from the header part to serve as a decompressed vertex component of one vertex without reference to the body part of the compressed vertex block.

If the decompressor 128 refers to a compression type recorded in the header part to determine that the "un"-type compression algorithm is used for compressing a data unit of a vertex component of an original vertex, the decompressor 128 decodes the header part (e.g., header-front portion and/or header-back portion) to obtain a recorded value being a portion of the vertex component (e.g., a unique nibble), and sets the recorded value obtained from the header part to serve as a data unit of a decompressed vertex component of one vertex without reference to the body part of the compressed vertex block.

If the decompressor 128 refers to a compression type recorded in the header part to determine that the "cn"-type compression algorithm is used for compressing a data unit of a vertex component of an original vertex, the decompressor 128 decodes the body part (e.g., a corresponding compressed vertex) of the compressed vertex block to obtain an index value, refers to the index value for obtaining a recorded value being a portion of the vertex component (e.g., a common nibble) from the header part (e.g., header-front portion and/or header-back portion), and outputs the recorded value obtained from the header part to serve as a data unit of a decompressed vertex component of one vertex.

If the decompressor 128 refers to a compression type recorded in the header part to determine that the "limited range"-type compression algorithm, such as "range1_1" compression algorithm, "range1_2" compression algorithm or "range1_3" compression algorithm, is used for compressing a data unit of a vertex component of an original vertex, the decompressor 128 decodes the body part (e.g., a corresponding compressed vertex) of the compressed vertex block to obtain a deviation value, obtain a base value (e.g., a range start value of the limited range) from the header part (e.g., header-front portion and/or header-back portion), and adds the deviation value to the base value to generate a data unit of a decompressed vertex component of one vertex.

If the decompressor 128 refers to a compression type recorded in the header part to determine that the "limited range"-type compression algorithm, such as "range2_1" compression algorithm or "range2_2" compression algorithm, is used for compressing a data unit of a vertex component of an original vertex, the decompressor 128 decodes the body part (e.g., a corresponding compressed vertex) of the compressed vertex block to obtain an index value and a deviation value, selects a target base value (e.g., a range start value of a limited range) from a plurality of recorded base values in the header part (e.g., header-front portion and/or header-back portion), and adds the deviation value to the target base value to generate a data unit of a decompressed vertex component of one vertex.

Figure 6:
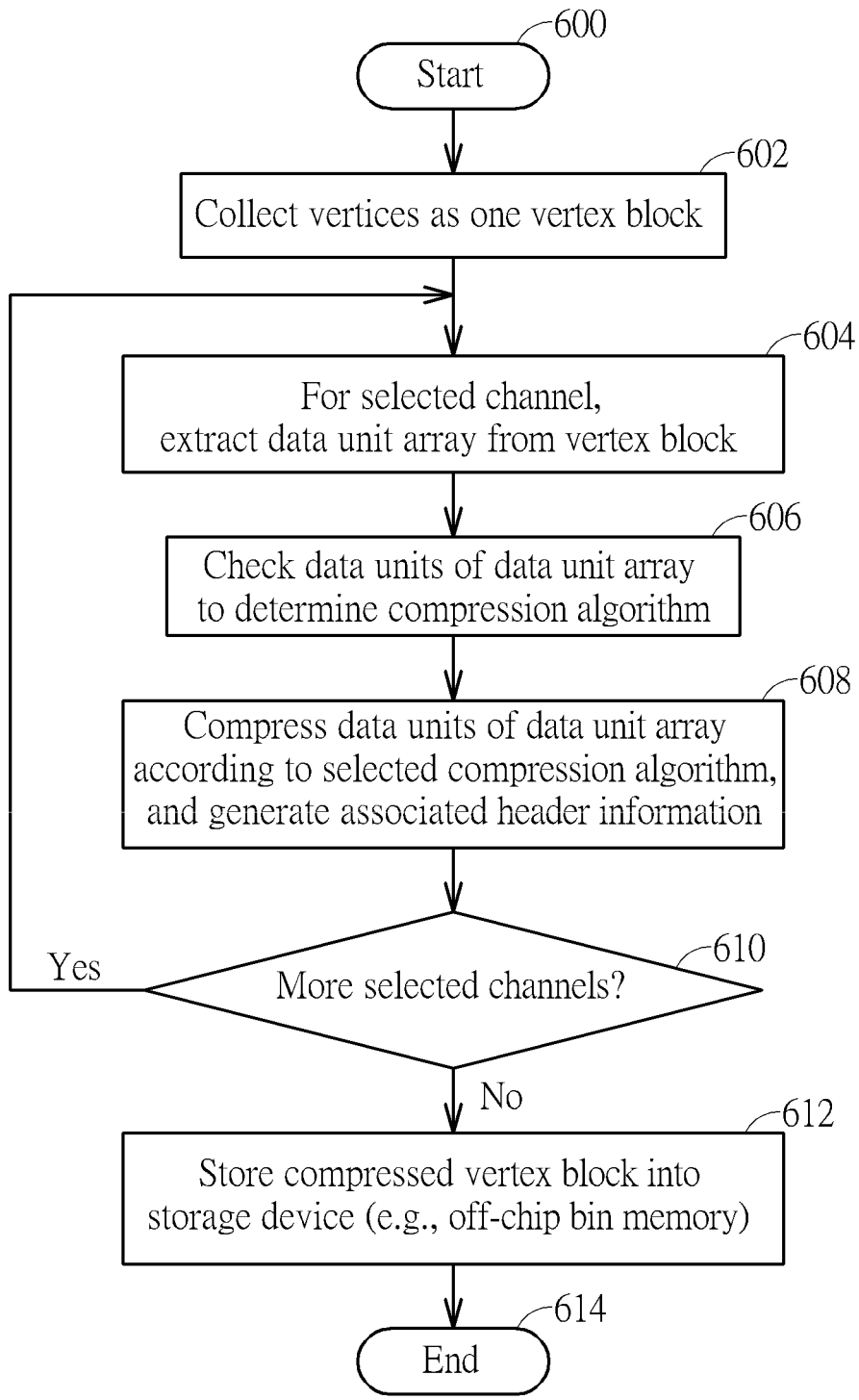
FIG. 6 is a flowchart illustrating a vertex data compression method according to an embodiment of the present invention.

FIG. 6 is a flowchart illustrating a vertex data compression method according to an embodiment of the present invention. Provided that the result is substantially the same, the steps are not required to be executed in the exact order shown in FIG. 6. The vertex data compression method may be employed by the vertex data compression apparatus 106 shown in FIG. 1, and may be briefly summarized as below.

Step 600: Start.

Step 602: Collect a plurality of vertices as a vertex block.

Step 604: For a selected channel, extract a data unit array from the vertex block, wherein the data unit array is composed of data units selected from vertex components of the vertices respectively, the data units correspond to the selected channel, and each of the data units is smaller than one byte.

Step 606: Check the data units of the data unit array to determine a compression algorithm.

Step 608: Compress the data units of the data unit array according to the selected compression algorithm, and generate associated header information including a compression type and compression-related value(s).

Step 610: Check if there are more selected channels to undergo data compression. If yes, go to step 604; otherwise, go to step 612.

Step 612: Store a compressed vertex block into a storage device (e.g., an off-chip bin memory), wherein the compressed vertex block includes a header part used to record header information of compressed vertices and a body part used to record the compressed vertices.

Step 614: End.

As a person skilled in the art can readily understand details of each step shown in FIG. 6 after reading above paragraphs directed to the vertex data compression apparatus 106, further description is omitted here for brevity.

Figure 7:
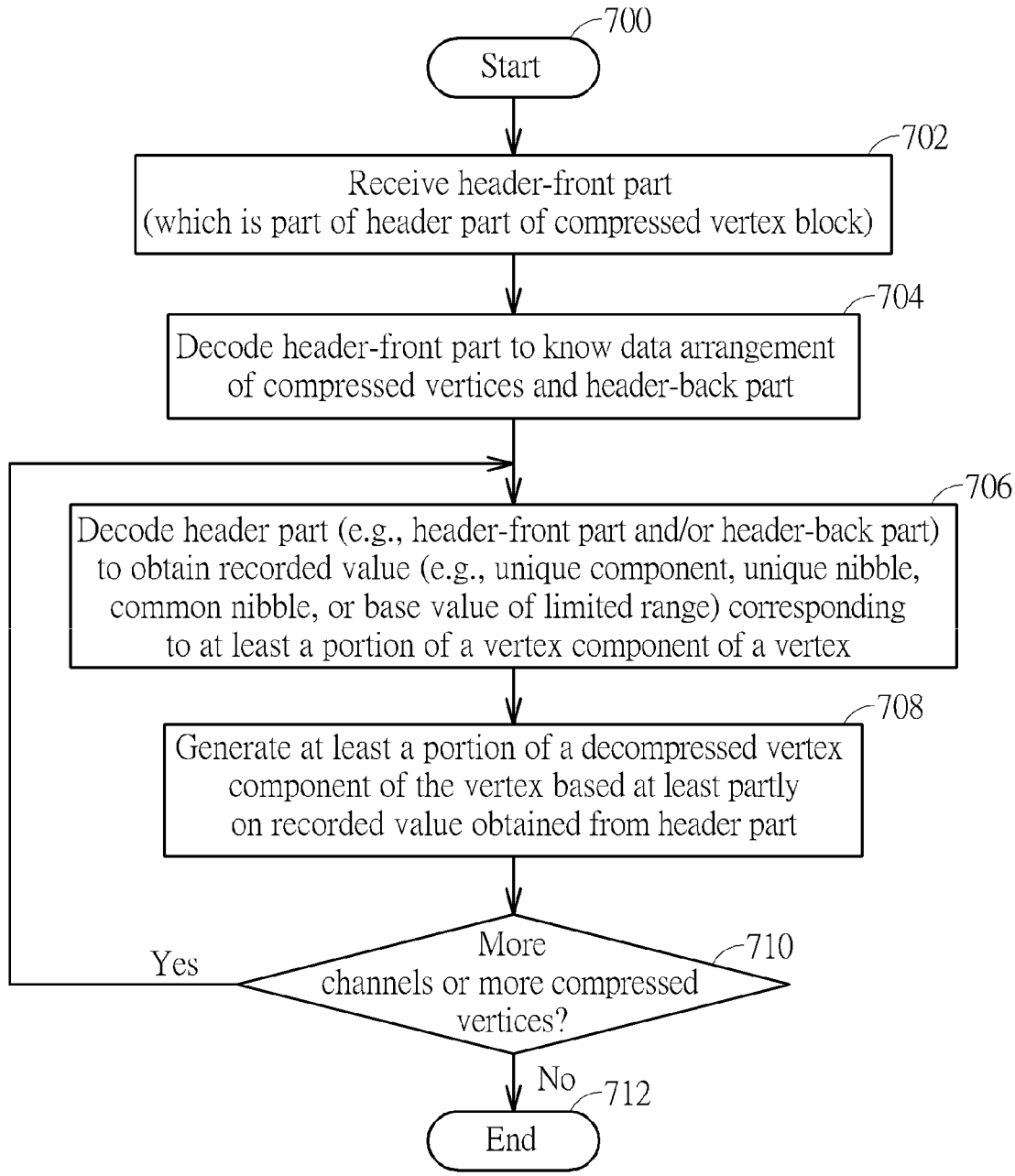
FIG. 7 is a flowchart illustrating a vertex data decompression method according to an embodiment of the present invention.

FIG. 7 is a flowchart illustrating a vertex data decompression method according to an embodiment of the present invention. Provided that the result is substantially the same, the steps are not required to be executed in the exact order shown in FIG. 7. The vertex data decompression method may be employed by the vertex data decompression apparatus 110 shown in FIG. 1, and may be briefly summarized as below.

Step 700: Start.

Step 702: Receive a header-front portion (which is a first portion of a header part of a compressed vertex block).

Step 704: Decode the header-front portion to know the data arrangement of compressed vertices in a body part of the compressed vertex block and a header-back portion (which is a second portion of the header part of the compressed vertex block).

Step 706: Decode the header part (e.g., header-front portion and/or header-back portion) to obtain a recorded value (e.g., a unique component, a unique nibble, a common nibble, or a base value of a limited range) corresponding to at least a portion of a vertex component of a vertex.

Step 708: Generate at least a portion of a decompressed vertex component of the vertex based at least partly on the recorded value obtained from the header part. For example, the decompressed vertex component may be set by the recorded value directly. For another example, a data unit of the decompressed vertex component may be set by a sum of the recorded value and a deviation value, where the deviation value may be obtained from decoding a corresponding compressed vertex in the body part of the compressed vertex block.

Step 710: Check if there are more channels or more compressed vertices to undergo data decompression. If yes, go to step 706; otherwise, go to step 712.

Step 712: End.

As a person skilled in the art can readily understand details of each step shown in FIG. 7 after reading above paragraphs directed to the vertex data decompression apparatus 110, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vertex data compression method comprising:
collecting a plurality of vertices as a vertex block;
extracting at least one data unit array from the vertex block, wherein each data unit array is composed of data units selected from vertex components of the vertices respectively, the data units correspond to a same channel, and each of the data units is smaller than one byte; and
for each data unit array, checking the data units of the data unit array to select a compression algorithm, and compressing the data units of the data unit array according to the selected compression algorithm;
wherein checking the data units of the data unit array to select the compression algorithm comprises:
classifying values possessed by the data units into at least one cluster;
wherein when the values possessed by the data units are classified into a plurality of clusters each having a plurality of consecutive values, referring to the at least one cluster found by the classifying step to select the compression algorithm;
wherein any value of one of the plurality of the clusters and any value of another of the plurality of clusters are discontinuous.

2. The vertex data compression method of claim 1, wherein a compressed vertex block includes compressed vertices generated from compressing the vertices in the vertex block, and the compressed vertices have a same bit width.

3. The vertex data compression method of claim 1, wherein checking the data units of the data unit array to select the compression algorithm further comprises:
when the values possessed by the data units are classified into only a single cluster having only a single value, referring to the at least one cluster found by the classifying step to select the compression algorithm.

4. The vertex data compression method of claim 3, wherein a compressed vertex block includes a header part and a body part, and the selected compression algorithm comprises:
recording the single value in the header part, wherein none of the values possessed by the data units are recorded in the body part.

5. The vertex data compression method of claim 1, wherein checking the data units of the data unit array to select the compression algorithm comprises:
when the values possessed by the data units are classified into only a single cluster having a plurality of consecutive values, referring to the at least one cluster found by the classifying step to select the compression algorithm.

6. The vertex data compression method of claim 5, wherein a compressed vertex block includes a header part and a body part, and the selected compression algorithm comprises:
recording a specific value selected from the consecutive values of the single cluster in the header part; and
with regard to each of the values possessed by the data units, recording a deviation value between the specific value and the value possessed by a data unit in the body part, wherein the value possessed by the data unit is not recorded in the body part.

7. The vertex data compression method of claim 1, wherein checking the data units of the data unit array to select the compression algorithm comprises:

when the values possessed by the data units are classified into a plurality of clusters each having only a single value, referring to the at least one cluster found by the classifying step to select the compression algorithm.

8. The vertex data compression method of claim 7, wherein a compressed vertex block includes a header part and a body part, and the selected compression algorithm comprises:
recording single values of the clusters in the header part; and
with regard to each of the values possessed by the data units, recording an index value of a cluster associated with the value possessed by a data unit in the body part, wherein the value possessed by the data unit is not recorded in the body part.

9. The vertex data compression method of claim 1, wherein a compressed vertex block includes a header part and a body part, and the selected compression algorithm comprises:
for each of the clusters, recording a specific value selected from the consecutive values of the cluster in the header part; and
with regard to each of the values possessed by the data units, recording an index value of a cluster associated with the value possessed by a data unit and a deviation value between the specific value of the associated cluster and the value possessed by the data unit in the body part, wherein the value possessed by the data unit is not recorded in the body part.

10. The vertex data compression method of claim 1, wherein each of the vertex components of the vertices is divided into a plurality of data units corresponding to a plurality of channels; a plurality of data unit arrays are extracted for the channels, respectively; and with regard to each of the data unit arrays, values possessed by data units of the data unit array that correspond to a same channel are classified into only a single cluster having only a single value.

11. The vertex data compression method of claim 10, wherein a compressed vertex block includes a header part and a body part, and the selected compression algorithm comprises:
recording a value equal to each of the vertex components in the header part, wherein none of the vertex components is recorded in the body part.

12. The vertex data compression method of claim 1, wherein each compressed vertex block includes a header part, and the header part includes a fixed-length portion and a variable-length portion.

13. The vertex data compression method of claim 1, wherein the vertex component includes one X-coordinate value and one Y-coordinate value each represented by a fixed-point format.

14. The vertex data compression method of claim 1, further comprising:
referring to a data type of the vertex components to select data unit arrays from the vertex components of the vertices for selective vertex data compression.

15. A vertex data decompression method comprising:
receiving data read from a compressed vertex block, wherein the compressed vertex block includes a header part and a body part, the compressed vertex block is generated from applying compression to at least one data unit array extracted from the vertex block, each data unit array is composed of data units selected from vertex components of vertices in the vertex block respectively, the data units correspond to a same channel, and each of the data units is smaller than one byte;
decoding the header part for obtaining a recorded value; and
generating at least a portion of a decompressed vertex component of one vertex based at least partly on the recorded value obtained from the header part;
wherein when an index value and a deviation value are obtained by decoding the body part, decoding the header part further comprises:
referring to the index value to select the recorded value from a plurality of recorded base values to serve as a target base value; and
when the recorded value is selected from the plurality of recorded base values to serve as the target value, generating at least the portion of the decompressed vertex component of one vertex further comprises:
adding the deviation value to the target base value to generate a data unit of the decompressed vertex component of one vertex.

16. The vertex data decompression method of claim 15, wherein generating at least the portion of the decompressed vertex component of one vertex comprises:
setting the recorded value as the decompressed vertex component without reference to the body part; or
setting the recorded value as a data unit of the decompressed vertex component without reference to the body part.

17. The vertex data decompression method of claim 15, further comprising:
when a deviation value is obtained by decoding the body part, decoding the header part comprises:
obtaining the recorded value to serve as a base value; and
when the recorded value is obtained to serve as the base value, generating at least the portion of the decompressed vertex component of one vertex comprises:
adding the deviation value to the base value to generate a data unit of the decompressed vertex component of one vertex.

18. The vertex data decompression method of claim 15, further comprising:
when an index value is obtained by decoding the body part, decoding the header part further comprises:
referring to the index value for selecting the recorded value from a plurality of values in the header part; and
when the recorded value is selected from the plurality of values in the header part, generating the decompressed vertex component of one vertex comprises:
outputting the recorded value as a data unit of the decompressed vertex component of one vertex.

19. A vertex data compression apparatus comprising:
a receiving circuit, arranged to collect a plurality of vertices as a vertex block; and
a compressor, arranged to extract at least one data unit array from the vertex block, wherein each data unit array is composed of data units selected from vertex components of the vertices respectively, the data units correspond to a same channel, and each data unit is smaller than one byte; and for each data unit array, check the data units of the data unit array to select a compression algorithm, and compress the data units of the data unit array according to the selected compression algorithm;
wherein checking the data units of the data unit array to select the compression algorithm comprises:

classifying values possessed by the data units into at least one cluster;

wherein when the values possessed by the data units are classified into a plurality of clusters each having a plurality of consecutive values, referring to the at least one cluster found by the classifying step to select the compression algorithm;

wherein any value of one of the plurality of the clusters and any value of another of the plurality of clusters are discontinuous.

20. A vertex data decompression apparatus comprising:

a receiving circuit, arranged to receive data read from a compressed vertex block, wherein the compressed vertex block includes a header part and a body part, the compressed vertex block is generated from applying compression to at least one data unit array extracted from the vertex block, each data unit array is composed of data units selected from vertex components of vertices in the vertex block respectively, the data units correspond to a same channel, and each of the data units is smaller than one byte; and a decompressor, arranged to decode the header part for obtaining a recorded value, and generate at least a portion of a decompressed vertex component of one vertex based at least partly on the recorded value obtained from the header part;

wherein the decompressor is further arranged to decode the body part;

wherein when an index value and a deviation value are obtained by decoding the body part, decoding the header part further comprises:

referring to the index value to select the recorded value from a plurality of recorded base values to serve as a target base value; and when the recorded value is selected from the plurality of recorded base values to serve as the target value, generating at least the portion of the decompressed vertex component of one vertex further comprises:

adding the deviation value to the target base value to generate a data unit of the decompressed vertex component of one vertex.

* * * * *